United States Patent
Li et al.

(10) Patent No.: US 11,685,321 B2
(45) Date of Patent: Jun. 27, 2023

(54) INTEGRATED MULTI-PURPOSE PERCEPTION HOUSING

(71) Applicant: TuSimple, Inc., San Diego, CA (US)

(72) Inventors: Qiwei Li, Tucson, AZ (US); Todd Skinner, Lakeside, CA (US); Yishi Liu, Tucson, AZ (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 17/556,717

(22) Filed: Dec. 20, 2021

(65) Prior Publication Data
US 2022/0111801 A1     Apr. 14, 2022

Related U.S. Application Data

(63) Continuation of application No. 16/407,141, filed on May 8, 2019, now Pat. No. 11,203,305.

(51) Int. Cl.
*B60R 11/04* (2006.01)
*B60R 11/00* (2006.01)
(Continued)

(52) U.S. Cl.
CPC ......... *B60R 11/04* (2013.01); *B60R 2011/004* (2013.01); *B60Y 2200/148* (2013.01); *B62D 65/16* (2013.01); *G05D 1/0231* (2013.01)

(58) Field of Classification Search
CPC ... B60R 11/00; B60R 11/04; B60R 2011/004; B60R 2011/0066; B60R 2011/0094;
(Continued)

(56) References Cited

U.S. PATENT DOCUMENTS

| | | |
|---|---|---|
| 4,029,246 A | 6/1977 | Woodruff |
| 4,830,557 A | 5/1989 | Harris |

(Continued)

FOREIGN PATENT DOCUMENTS

| | | |
|---|---|---|
| CN | 103241186 B | 4/2015 |
| DE | 202016007625 U1 | 3/2018 |

(Continued)

OTHER PUBLICATIONS

Calamar, George. European Application No. 20165241.9-1132 Extended European Search Report dated Jun. 18, 2020, pp. 1-8.
(Continued)

*Primary Examiner* — David P Bryant
*Assistant Examiner* — Christine Bersabal
(74) *Attorney, Agent, or Firm* — Paul Liu; Julie J. Muyco; Perkins Coie, LLP

(57) ABSTRACT

An integrated housing assembly can be mounted on a roof of a vehicle, such as a semi-trailer truck. The integrated housing assembly includes a main enclosure that includes four sides, a top panel, and a bottom panel. One of the four sides is a front panel that is inclined towards the ground. The main enclosure includes one or more cavities. A front panel of the integrated housing assembly includes one or more openings to allow cameras or sensors to be placed within the one or more cavities and behind the one or more opening. The cameras or sensors cameras can be clamped at a downward angle within multiple lock apparatus. The angled front panel and the inclined cameras or sensors within the lock apparatus allow the cameras or sensors to obtain images or sensor data from one or more regions of interest at some distance from the front of the vehicle.

20 Claims, 8 Drawing Sheets

(51) Int. Cl.
*B62D 65/16* (2006.01)
*G05D 1/02* (2020.01)

(58) Field of Classification Search
CPC .. B60Y 2200/148; G01D 11/24; G01D 11/30; G05D 1/0231; B62D 65/16
See application file for complete search history.

(56) References Cited

U.S. PATENT DOCUMENTS

| | | | |
|---|---|---|---|
| 9,075,290 | B1 | 7/2015 | Thieman |
| D894,770 | S | 9/2020 | Jackson |
| D927,581 | S | 8/2021 | Ma |
| 11,203,305 | B2 | 12/2021 | Li |
| 2004/0119881 | A1 | 6/2004 | Matko et al. |
| 2005/0265711 | A1 | 12/2005 | Heibel |
| 2006/0066835 | A1 | 3/2006 | Laufer |
| 2012/0081550 | A1 | 4/2012 | Sewell |
| 2012/0327230 | A1 | 12/2012 | Ellison |
| 2014/0369746 | A1 | 12/2014 | Heston |
| 2015/0131982 | A1 | 5/2015 | Starns |
| 2016/0191863 | A1* | 6/2016 | Minikey, Jr. ......... H04N 5/2252 348/148 |
| 2016/0355142 | A1 | 12/2016 | Hinge et al. |
| 2017/0261064 | A1 | 9/2017 | Liu et al. |
| 2018/0069993 | A1 | 3/2018 | Hart |
| 2020/0189487 | A1* | 6/2020 | McKendrick ......... G01S 17/931 |
| 2020/0307467 | A1 | 10/2020 | Skinner |
| 2021/0402962 | A1 | 12/2021 | Li |
| 2022/0111800 | A1 | 4/2022 | Li |
| 2022/0179294 | A1 | 6/2022 | Cywinski |

FOREIGN PATENT DOCUMENTS

| | | |
|---|---|---|
| EP | 3470270 A1 | 4/2019 |
| WO | 2001070539 A1 | 9/2001 |
| WO | 2017065954 A1 | 4/2017 |

OTHER PUBLICATIONS

Extended European Search Report for European Patent Application No. 20170877.3, dated Oct. 30, 2020.
U.S. Appl. No. 17/556,600 Non-Final Office Action dated Sep. 16, 2022, pp. 1-9.
Design U.S. Appl. No. 29/694,550 Non-Final Office Action dated Oct. 6, 2022, pp. 1-8.

* cited by examiner

INTEGRATED MULTI-PURPOSE PERCEPTION HOUSING

CROSS-REFERENCE TO RELATED APPLICATION(S)

This application is a continuation of U.S. application Ser. No. 16/407,141, entitled "INTEGRATED MULTI-PURPOSE PERCEPTION HOUSING", filed May 8, 2019. The entire content of the above-mentioned patent application is incorporated by reference as part of the disclosure of this document.

TECHNICAL FIELD

This document relates to housings for sensors, cameras, and/or other devices for a vehicle such as an autonomous semi-trailer truck.

BACKGROUND

A vehicle may include cameras mounted or installed on top of the vehicle for several purposes. For example, cameras may be mounted to a roof of the vehicle for security purposes, for driving aid, or for facilitating autonomous driving. However, when cameras are mounted on a vehicle, they are individually calibrated or adjusted so that the images obtained by the cameras can be properly processed. Moreover, a vehicle with visible roof mounted cameras may receive constant attention either from drivers in other vehicles or from other people, which can lead to an unsafe driving environment or a security/theft issue.

SUMMARY

Disclosed are devices, systems and methods for an integrated multi-purpose perception housing that can include cameras and/or sensors within an enclosure. The integrated housing assembly can be mounted on a roof of a vehicle, such as a semi-trailer truck.

An exemplary integrated mount system comprises an enclosure that includes a top surface, a bottom surface opposite to the top surface, and four side surfaces attached to the top surface and the bottom surface. The four side surfaces comprise a first side surface opposite to a third side surface, and a second side surface opposite to a fourth side surface, and the first side surface has an opening. The enclosure includes a cavity is located in between the four side surfaces, where the cavity is accessible via the opening, a first set of holes that extend from the top surface to the bottom surface, where the first set of holes are located between the cavity and the third side surface, a top panel coupled to the top surface of the enclosure, and a bottom panel coupled to the bottom surface of the enclosure, where an angle formed between the first side surface and the bottom panel is an obtuse angle.

In some embodiments, the opening is separated by one or more frame portions of the first side surface to form a plurality of sub-openings in the first side surface, the cavity is separated by one or more side walls that extend between the first side surface and the third side surface to form a plurality of sub-cavities, each sub-cavity corresponds to and is accessible via each sub-opening, and the plurality of sub-cavities are located one after another along a length-wise direction of the enclosure from the second side surface to the fourth side surface.

In some embodiments, the integrated mount system further comprises a second set of holes that extends from the third side surface to an inner surface of the cavity, where each of the one or more side walls includes a hole that extends along the length-wise direction from one end to another opposite end of a same side wall, where the second side surface includes a hole that extends along the length-wise direction from one end to another opposite end of the second side surface, and where the fourth side surface includes a hole that extends along the length-wise direction from one end to another opposite end of the fourth side surface.

In some embodiments, the integrated mount system further comprises a first set of lock apparatus coupled to the bottom panel of the enclosure and located within the cavity, where each lock apparatus of the first set comprises: a solid top portion comprising: a first top surface, a first bottom surface opposite to the first top surface and comprising a first set of cutout regions, and a set of holes that extend from the first top surface to the first bottom surface; a solid bottom portion comprising: a second top surface attached to four side surfaces, where the second top surface comprises another set of holes corresponding to the set of holes, and where the second top surface includes a second set of cutout regions, a second bottom surface opposite to the second top surface, and where the solid top portion coupled to the solid bottom portion aligns the first set of cutout regions with the second set of cutout regions to form a plurality of through holes having a inclined angle relative to the second bottom surface.

In some embodiments, the integrated mount system further comprises a plurality of cameras partially fastened in between the plurality of through holes, where each camera has a lens that faces the opening. In some embodiments, the integrated mount system further comprises a plurality of fastener assemblies that couple the enclosure to a vehicle, where herein each fastener assembly is located within each hole of the first set of holes, and where a top of each fastener assembly is located below the top panel. In some embodiments, the vehicle is a semi-trailer truck.

In some embodiments, each hole includes an inner wall having a protrusion at a depth less than a height of each hole, the height of each hole is determined from the top surface to the bottom surface, each fastener assembly includes a first set of washers located on top of the protrusion, each fastener assembly includes a second set of washers and a ball joint swivel bearing located below the protrusion, and each faster assembly includes a screw structured to engage one or more brackets on top of the vehicle.

In some embodiments, the first set of holes comprises a first hole, a second hole, and a third hole, where the first hole and the second hole are located on opposite sides of the enclosure in between the cavity and the third side surface, where the third hole is located in a middle region of the enclosure in between the cavity and the third side surface, and where the first hole and the second hole have a first shape that is different from a second shape of the third hole.

In some embodiments, an exterior surface of the enclosure formed by the four side surfaces, the top panel, and the bottom panel includes a white high reflectivity exterior surface, and an interior surface of the enclosure formed by the cavity includes a black anodized interior surface. In some embodiments, the obtuse angle is approximately 160°. In some embodiments, the top panel and the bottom panel are flat. In some embodiments, a perimeter of the top panel has a first shape that corresponds to a second shape of a perimeter of the top surface of the enclosure.

In some embodiments, the integrated mount system further comprises a first side enclosure coupled to the second side surface, and a second side enclosure coupled to the fourth side surface, where each of the first side enclosure and the second side enclosure, comprises: a second top panel coupled to a top surface of each side enclosure, a second bottom panel coupled to a bottom surface of each side enclosure, and a plurality of side surfaces comprising at least a fifth side surface, a sixth side surface, and a seventh side surface, where the fifth side surface of each side enclosure is coupled to the second side surface or the fourth side surface of the enclosure, where each of the sixth side surface and the seventh side surface have another opening, and where an angle formed between the sixth side surface and the seventh side surface is a second obtuse angle. In some embodiments, the second top panel and the second bottom panel are flat. In some embodiments, the second obtuse angle is approximately 135°.

In some embodiments, the integrated mount system further comprises a second set of lock apparatus coupled to the second bottom panel of each of the first side enclosure and the second side enclosure, where each lock apparatus of the second set is located within the first side enclosure or the second side enclosure, where each lock apparatus of the second set comprises: a solid top portion comprising: a first top surface, a first bottom surface opposite to the first top surface and comprising a first set of cutout regions, and a set of holes that extend from the first top surface to the first bottom surface; a solid bottom portion comprising: a second top surface attached to four side surfaces, where the second top surface comprises another set of holes corresponding to the set of holes, and where the second top surface includes a second set of cutout regions; a second bottom surface opposite to the second top surface, and where the solid top portion coupled to the solid bottom portion aligns the first set of cutout regions with the second set of cutout regions to form a plurality of through holes having a inclined angle relative to the second bottom surface.

In some embodiments, the integrated mount system further comprises a plurality of cameras partially fastened in between the plurality of through holes, where each camera has a lens that faces either the another opening in the sixth side surface or the another opening in the seventh side surface.

An exemplary mount apparatus is disclosed comprising a solid top portion and a solid bottom portion. The solid top portion comprises a first top surface, a first bottom surface opposite to the first top surface and comprising a first set of cutout regions, and a set of holes that extend from the first top surface to the first bottom surface. The solid bottom portion comprises a second top surface attached to four side surfaces, where the second top surface comprises another set of holes corresponding to the set of holes, and where the second top surface includes a second set of cutout regions, a second bottom surface opposite to the second top surface, and where the solid top portion coupled to the solid bottom portion aligns the first set of cutout regions with the second set of cutout regions to form a plurality of through holes having a inclined angle relative to the second bottom surface.

In some embodiments of the mount apparatus, two of the side surfaces are inclined relative to the second bottom surface, one inclined side surface has a first height that is shorter than a second height of another inclined side surface, and the first height and the second height are determined relative to the second bottom surface. In some embodiments, the mount apparatus further comprises a plurality of cameras partially fastened in between the plurality of through holes.

An exemplary method for mounting an assembly on a vehicle is disclosed. The method comprises mounting cameras or sensors in a plurality of mount apparatus, coupling a first set of the plurality of mount apparatus to a bottom panel of an enclosure, where the enclosure comprises four side surfaces attached to a top surface and a bottom surface, where the four side surfaces comprise a first side surface opposite to a third side surface, and a second side surface opposite to a fourth side surface, where the first side surface has an opening, where a cavity is located in between the four side surfaces, and where the cavity is accessible via the opening; coupling a top panel and the bottom panel to the top surface and the bottom surface, respectively, where the first set of the plurality of mount apparatus coupled to the bottom panel have cameras with lenses or sensors that face the opening; and coupling the enclosure to a vehicle.

In some embodiments, the exemplary method further comprises coupling a second set of the plurality of mount apparatus to a second bottom panel of each of the first side enclosure and the second side enclosure, where each of the first side enclosure and the second side enclosure comprises a plurality of side surfaces comprising at least a fifth side surface, a sixth side surface, and a seventh side surface, and where each of the sixth side surface and the seventh side surface have another opening; coupling a second top panel to a top surface of each of the first side enclosure and the second side enclosure; coupling the second bottom panel to a bottom surface of each of the first side enclosure and the second side enclosure, where the second set of the plurality of mount apparatus coupled to the second bottom panel have cameras with lenses or sensors that face either the another opening in the sixth side surface or the another opening in the seventh side surface; coupling the fifth side surface of the first side enclosure to the second side surface of the enclosure; and coupling the fifth side surface of the second side enclosure to the fourth side surface of the enclosure.

The above and other aspects and their implementations are described in greater detail in the drawings, the descriptions, and the claims.

DETAILED DESCRIPTION

This patent document describes an integrated multipurpose perception housing that can be mounted on a roof of a vehicle, such as a semi-trailer truck. The integrated multi-purpose perception housing provides a discrete and stable enclosure for cameras and/or sensors used for autonomous driving. The discrete enclosure allows cameras, sensors and/or other devices to be located within the integrated multipurpose perception housing so that such equipment does not draw as much attention as conventional mounting apparatus where cameras, sensors, and/or other devices are visibly mounted on top of a mounting apparatus installed on a roof of a vehicle. Furthermore, the stable enclosure allows cameras, sensors, and/or other devices to be securely and easily coupled to the integrated multipurpose perception housing at desired angles and locations so that the cameras, sensors, and/or other devices can obtain the desired field of views without needing as much calibration or adjustment compared to conventional mounting apparatus. An example of an integrated multipurpose perception housing is an integrated housing assembly described in this patent document.

Figure 1A:
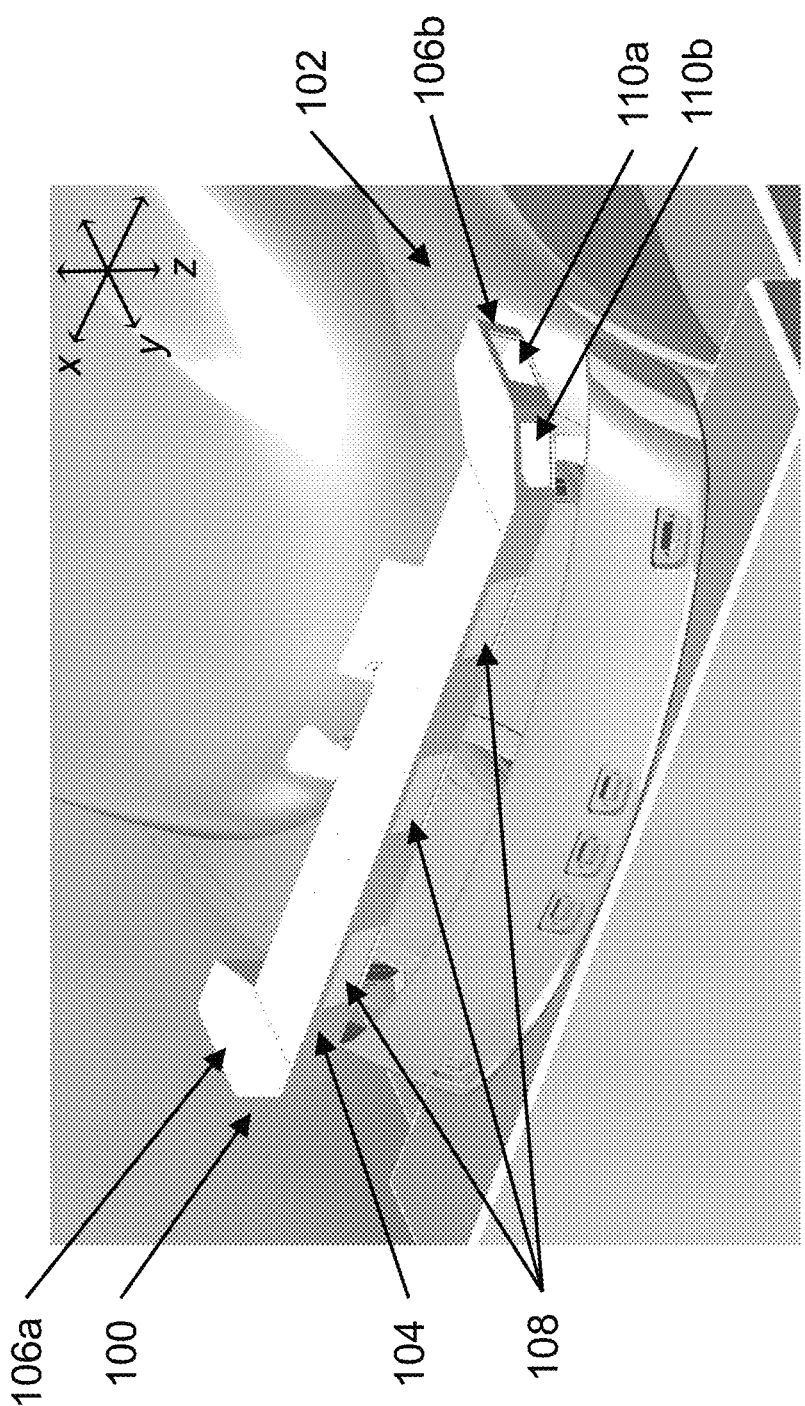
FIG. 1A shows an example integrated housing assembly mounted on a front portion of a roof of a vehicle.

FIG. 1A shows an example integrated housing assembly 100 mounted on a front portion of a roof 102 of a vehicle. In FIG. 1A, the integrated housing assembly 100 is coupled to one or more brackets located on top of a cab of a semi-trailer truck. By installing the integrated housing assembly 100 on the front portion of the roof 102, the cameras installed inside the integrated housing assembly and facing the openings 108 in the integrated housing assembly can obtain images of a driving environment in front of and/or on the sides of the semi-trailer truck. This patent document describes cameras being installed within the integrated housing assembly as an example. In some embodiments, sensors and/or other devices may be installed within the integrated housing assembly in a similar manner as the cameras described in this patent document. The top right-hand corner of FIGS. 1A and 2 to 4 includes a three-dimensional axis to further describe the dimensions of the parts of integrated housing assembly 100. Unless otherwise indicated, in this patent document the length of a part is generally determined along the x-axis, the width of a part is generally determined along the y-axis and the height of a part is generally determined along the z-axis.

The integrated housing assembly 100 includes a main enclosure 104 and two optional side enclosures 106a, 106b. The main enclosure 104 has openings 108 located in a front panel. The openings 108 allow cameras located inside the main enclosure 104 and facing towards the openings 108 to obtain images from one or more areas in front of the semi-trailer truck. The length of the main enclosure 104 can be less than the distance from one side of the vehicle to another side of the vehicle. The width and height of the main enclosure are determined based on the dimensions of the cameras that are to be installed inside the main enclosure 104.

Figure 1B:
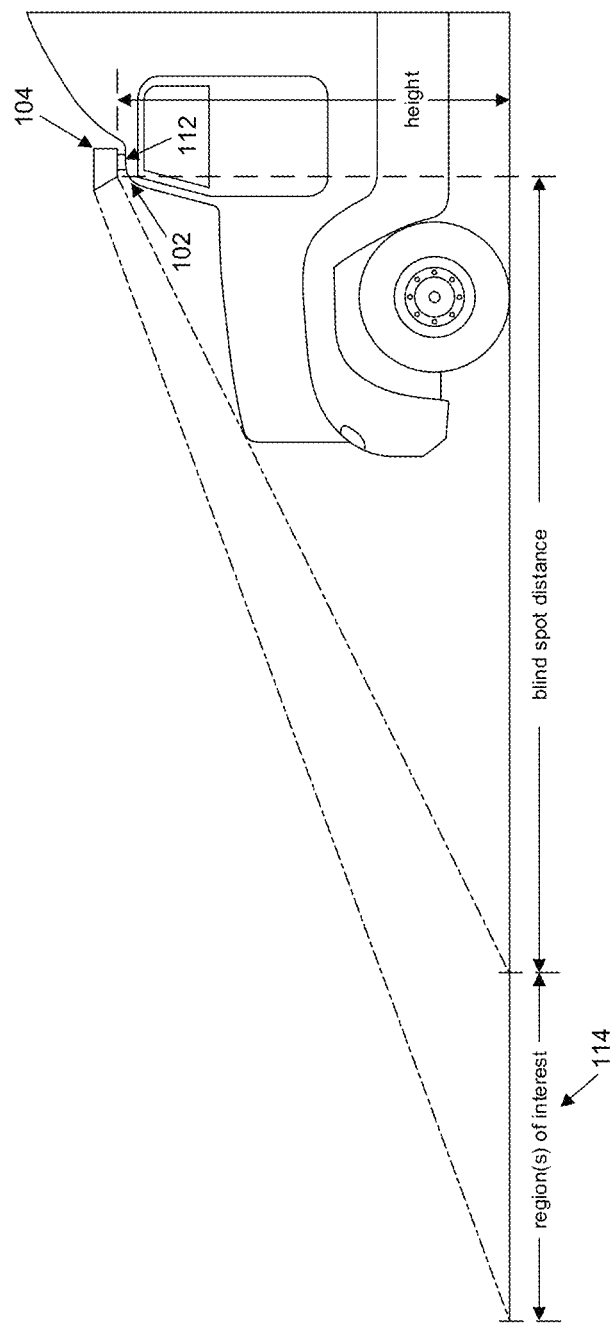
FIG. 1B shows a side profile view of the integrated housing assembly mounted on a front portion of a roof of a vehicle.

The main enclosure 104 when viewed along the y-z plane can have a trapezoid-like shape (as shown in FIG. 1B) with a top and bottom panel of the main enclosure 104 being parallel to each other, the rear panel of the main enclosure 104 being perpendicular to the top and/or bottom panels, and the front panel of the main enclosure 104 being angled towards the road or ground. Thus, the width of the top panel of the main enclosure 104 is greater than the width of the bottom panel of the main enclosure 104. A benefit of the angled front panel is that it can reduce the amount of direct sunlight directed to the lens of the cameras. As explained in FIG. 1B, another benefit of the angled front panel is that it can allow the cameras mounted within the main enclosure 104 to be able to better capture a region of interest in front of the vehicle. The exemplary features of the main enclosure 104 are further described in FIG. 2.

In embodiments where the integrated housing assembly 100 includes the two optional side enclosures, a first side enclosure 106a can be coupled to one end of the main enclosure 104 and a second side enclosure 106b can be coupled to another end of the main enclosure. Each side enclosure can be a six-sided polygon as further described in FIG. 3. The width and height of one of the sides of the side enclosure can be the same as the width and height of a side panel of the main enclosure 104, so that when a side enclosure is coupled to the main enclosure 104, the top and bottom panels or surfaces of the side enclosure can be at the same level as the top and bottom panels or surfaces of the main enclosure 104.

The two side enclosures 106a, 106b include two front panels at an angle from each other, where the each of the two panels includes two openings 110a, 110b that allows cameras facing towards the openings 110a, 110b to obtain images of areas on each side of the semi-trailer truck. The two side enclosures 106a, 106b can be considered a driver side enclosure body and a passenger side enclosure body to distinguish and process the images obtained from cameras in the two side enclosures. The exemplary features of the side enclosure are further described in FIG. 3.

The integrated housing assembly may be an aluminum enclosure assembly with a white smooth high reflectivity exterior surface and a black rough anodized interior surface. A white high reflectivity exterior surface can reflect light from the sun and can thus allow the temperature inside the integrated housing assembly 100 to be less than the maximum operating temperature of the cameras installed inside the integrated housing assembly 100. A black rough interior surface can absorb stray light or light that can cause glare or other light pollution within the cameras installed inside the integrated housing assembly 100.

FIG. 1B shows a side profile view of the integrated housing assembly mounted on a front portion of a roof 102 of a semi-trailer truck. FIG. 1B shows the integrated housing assembly with the main enclosure 104 and without the optional side enclosures for ease of description. The main enclosure 104 is mounted to the roof 102 of the semi-trailer truck via one or more brackets 112. The main enclosure 104 when mounted on the roof 102 can be located at a certain height above the ground and at a distance away from the front bumper or radiator grille of the semi-trailer truck. Since the main enclosure 104 can include cameras mounted in a camera lock apparatus (as described in FIG. 4), the cameras may be unable to obtain an image of an area immediately front of the semi-trailer truck. A side profile view of this area is shown as including the "blind spot distance" in FIG. 1B. A beneficial feature of the main enclosure 104 and the optional side enclosures is that they are designed to have a front panel that is inclined or angled towards the ground (shown for the main enclosure in FIG. 1B) so that the cameras in the integrated housing assembly can capture images of one or more regions of interest 114 that can be located adjacent to the blind spot region or that can be located at some distance past the blind spot region in front of the vehicle. As further described in FIG. 4, a camera lock apparatus can also allow the cameras to be mounted at an incline so that the cameras can more effectively capture one or more regions of interest 114 in front of the semi-trailer truck.

Figure 2:
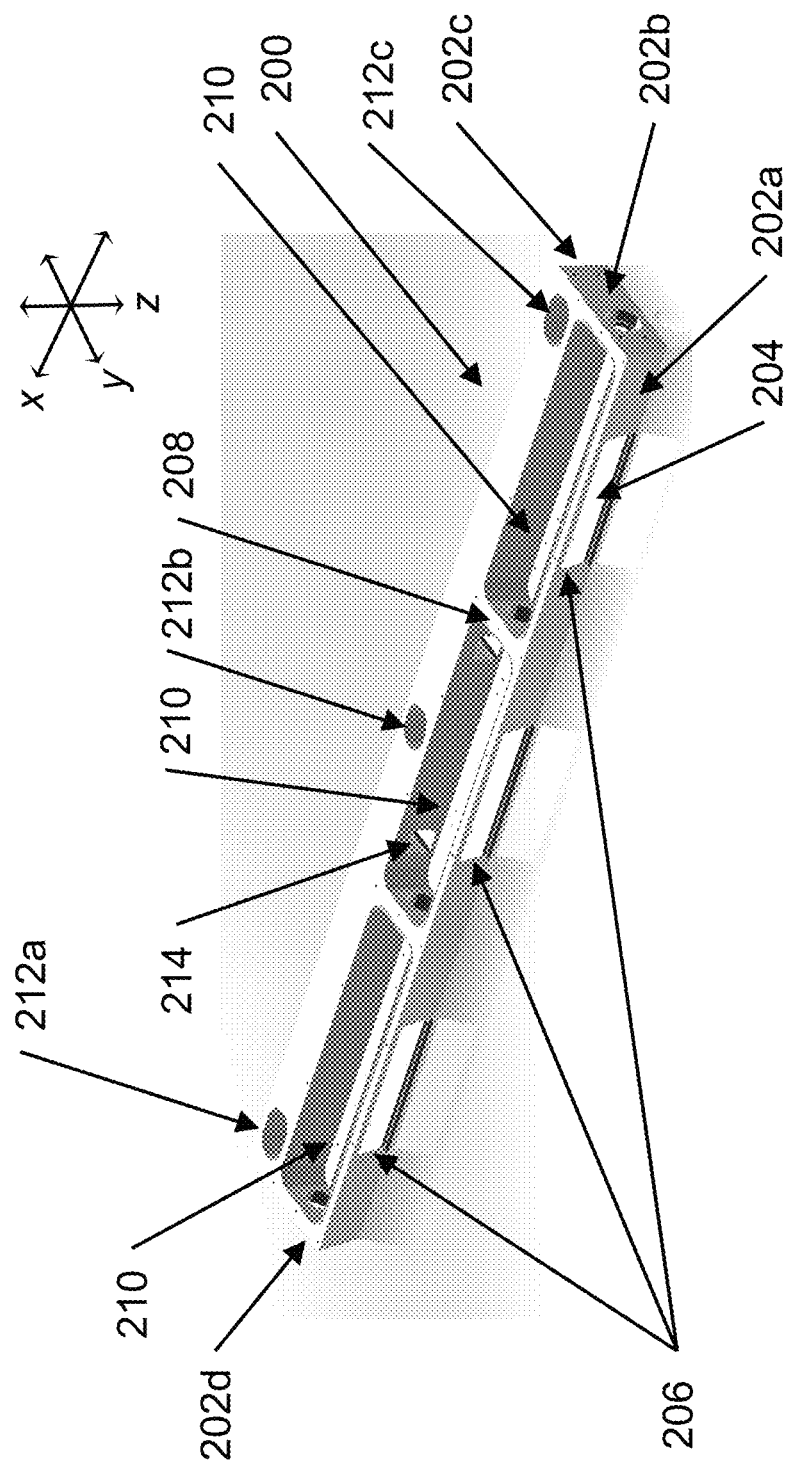
FIG. 2 describes an exemplary main enclosure of the integrated housing assembly.

FIG. 2 describes an exemplary main enclosure 200 of the integrated housing assembly. The main enclosure 200 comprises a removable and flat top panel (not shown in FIG. 2), four flat panels 202a-202d that form the four sides of the main enclosure 200, and a removable and flat bottom panel 204. The main enclosure 200 without its top and bottom panels can have a flat rectangular top surface and a flat rectangular bottom surface. As mentioned above, the main enclosure 200 when viewed along the y-z plane can have a trapezoid-like shape. Thus, the top and bottom surfaces of the main enclosure 200 can be parallel to each other and the top and bottom surfaces of the main enclosure 200 can be perpendicular to a rear panel 202c. The edge of the rear panel 202c can be seen in FIG. 2. The main enclosure 200 can be machined from a single block of aluminum or another metal with the four panels 202a-202d and with the openings 206, cavities 210, and various holes shown in FIG. 2. Thus, in some embodiments, the four panels 202a-202d are not removable and are a part of the structure that forms the main enclosure 200.

The top and bottom surfaces of the main enclosure 200 are covered by the top panel and the bottom panel 204, respectively. FIG. 2 shows the main enclosure 200 without its top panel to more clearly describe the features of the main enclosure 200. The top panel of the main enclosure 200 is seen in FIG. 1A and has a rectangular shape that corresponds to the rectangular shape of the top surface of the main enclosure 200. In FIG. 2, the bottom panel 204 can be seen through the openings 206 of the front panel 202a. The bottom panel has a rectangular shape that extends from the bottom edge of the front panel 202a up until the holes 212a-212c that include an inner wall with a protrusion (as further described in FIG. 5B). The bottom panel does not extend over the holes 212a-212c so that a vibration and fastener kit (described in FIGS. 5A and 5B) can be inserted in the holes 212a-212c to couple the main enclosure to one or more brackets on a vehicle (as described in FIG. 5B). The top and bottom surfaces of the main enclosure 200 include a plurality of threaded screw holes located around the periphery of the three cavities 210 to couple the top and bottom panels to the main enclosure 200. The top and bottom panels may be coupled to the respective top and bottom surfaces of the main enclosure 200 using screws.

The width of the top surface of the main enclosure 200 is greater than the width of the bottom surface of the main enclosure 200 in part because the front panel 202a is angled towards the road or ground. The front panel 202a is designed to have a pre-determined obtuse angle (e.g., greater than 90°) relative to the bottom panel 204. In some embodiments, the angle formed between the front panel 202a and the bottom panel 204 may be approximately 160°.

FIG. 2 shows that the front panel 202a has three separate openings 206 or three separate areas that are cut out from the front panel 202a. The three openings 206 are located next to each other on the front panel 202a. Each opening 206 has a rectangular shape and each opening is separated from another adjacent opening by some distance. Between each opening is a flat frame portion that comprises the front panel 202a. In some embodiments, each opening 206 on the front panel 202a may extend from the top surface to the bottom surface of the main enclosure 200. Each opening 206 leads to a cavity located behind the front panel 202a. A plurality of openings in the front panel 202a may be referred to a plurality of sub-openings. In some embodiments, the main enclosure 200 may have a single cavity accessible via a single opening in the front panel 202a. In some embodiments, the main enclosure 200 may have two or more sub-cavities, and the front panel 202a may have two or more corresponding sub-openings, where each sub-cavity in the main enclosure 200 is accessible via a separate sub-opening in the front panel 202a.

A front region of the main enclosure 200 includes three cavities located behind each of the three openings 206. One of the cavities 210 is identified in FIG. 2. A rear region of the main enclosure behind the three cavities includes a solid region that includes three holes 212a-212c that extend vertically along the entire height of the main enclosure 200. Two of the holes 212a, 212c are located on either side of the main enclosure 200 and one of the hole 212b is located in a middle of the length of the main enclosure. The two outer holes 212a, 212c can have an oval shape to allow for manufacturing tolerancing and/or thermodynamic change such as thermal expansion of the main enclosure 200, and the middle hole 212b can have a circular shape that can allow the main enclosure 200 to be centered in a middle portion of a roof of a vehicle (as shown in FIG. 1A). The cross-section of the main enclosure 200 with holes 212a-212c is shown in FIG. 5B where the through hole has a protrusion (550 in FIG. 5B) at a depth less than the height of the main enclosure 200. A width of each cavity 210 is less than the width of the main enclosure 200 to allow a rear region of the main enclosure to have the holes 212a-212c. The length of each cavity 210 can be greater than the length of its corresponding opening 206 in the front panel 202a, and the height of each cavity 210 can be the same as the height of the main enclosure 200. A plurality of cavities may be referred to as a plurality of sub-cavities.

Each cavity 210 has four side walls, where one of the walls forms part of the front panel with an opening. The two cavities on either ends of the main enclosure 200 share one of their respective walls with the two side panels 202b, 202d. Thus, the interior surface of the side panel 202b forms one of the walls of a cavity on one end of the main enclosure 200, and the interior surface of the side panel 202d forms one of the walls of a cavity on the opposite end of the main enclosure 200. The cavity is enclosed on top and bottom by the removable top panel and the removable bottom panel 204. The length, width, and height of a cavity is designed to allow one or more cameras with their electrical cabling to be installed in the cavity. For example, three cameras may be installed in each cavity where one of the cameras may be recording images and the other two cameras may be redundant or backup cameras.

FIG. 2 shows that a rear wall of a middle cavity includes two through holes 214 that extends width-wise or along the y-axis from the rear wall of the middle cavity to the rear panel 202c. One of the through holes 214 is identified in FIG. 2 and is shown to have a square-like shape. The through holes 214 allow electrical cabling to be inserted through the main enclosure 200 to the middle cavity. The electrical cabling allows the cameras to receive power from and to provide images to a signal processing unit located in the vehicle on which the main enclosure 200 in installed.

Each cavity can be separated by an adjacent cavity by a sidewall 208 that include a single through hole that extends length-wise or along the x-axis to allow part of the electrical cabling inserted into the main enclosure 200 to be routed through the sidewall 208 to the cameras located in the other cavities. A benefit of having a middle cavity include two through holes is that it facilitates better cable management so that two cable bundles can be inserted into the main enclosure and can be routed to the other cavities via the through holes in the sidewalls 208. A benefit of the sidewall 208 is that it can provide structural rigidity in a middle region of the main enclosure 200 and can allow for electrical cables to be routed from one cavity to another cavity. In some embodiments, a rear wall of each cavity may include a through hole that extends from the rear wall of each cavity to the exterior surface of the rear panel 202c.

FIG. 2 shows that the two side panels 202b, 202d form the two ends of the main enclosure 200, where one of the walls of the two cavities located on opposite sides of the main enclosure 200 includes one of the side panels 202b, 202d. Each side panel 202b, 202d includes a through hole that extends length-wise or along the x-axis from inside each of the two cavities to the exterior surface of the side panels 202b, 202d. A benefit of having each side panel 202b, 202d with a through hole is that it allows the electrical cabling inserted through the through holes 214 to be routed through the through hole in the sidewalls 208 and through the side panels 202b, 202d to the optional side enclosures further described in FIG. 3. The exterior surface of the side panels 202b, 202d include a plurality of screw holes to couple the two optional side enclosures to the side panels 202b, 202d of the main enclosure.

Figure 3:
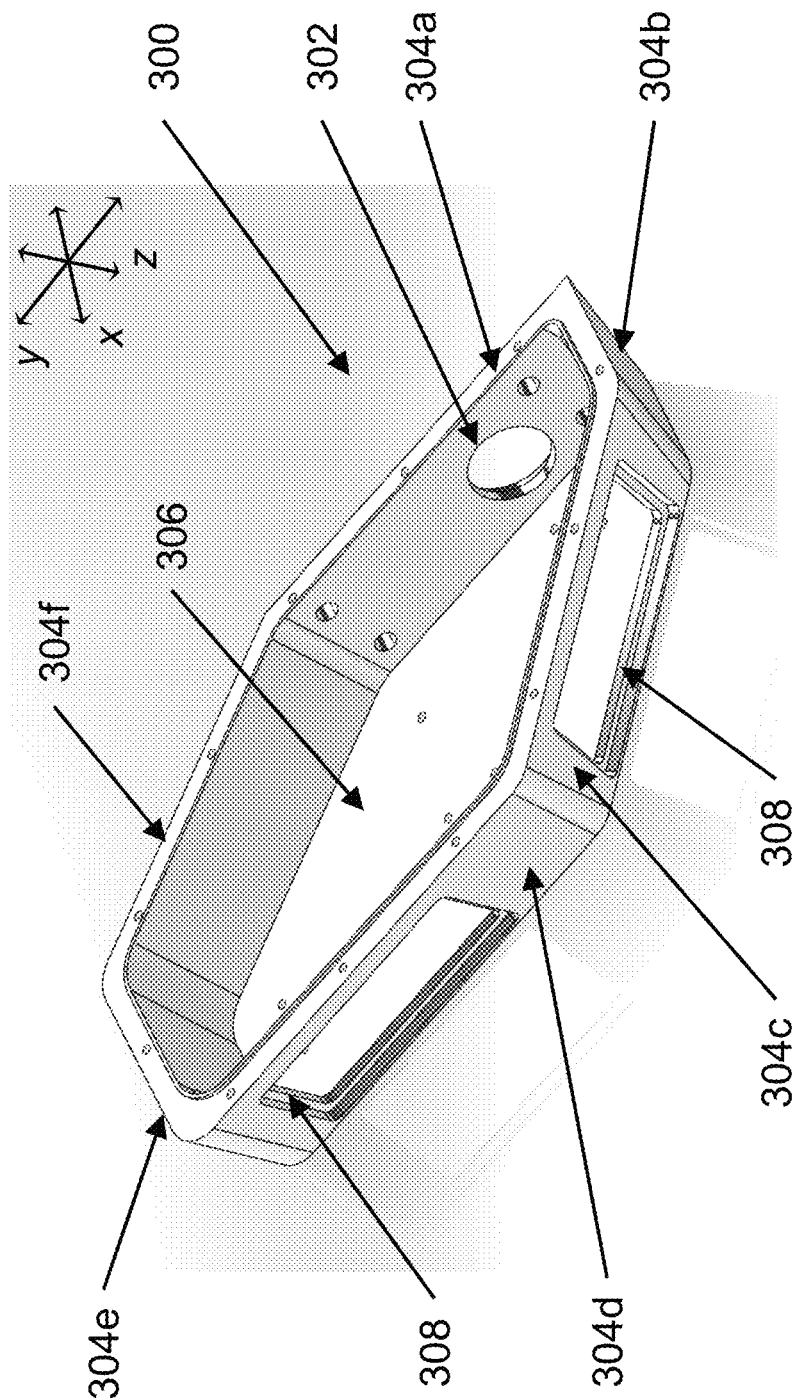
FIG. 3 describes an exemplary and optional side enclosure of the integrated housing assembly.

FIG. 3 describes an exemplary side enclosure 300 of the integrated housing assembly. Each of the two optional side enclosures shown in FIG. 1A can have the same design as shown in FIG. 3. The side enclosure 300 comprises a removable and flat top panel (not shown in FIG. 3), six flat panels 304a-302f that form the six sides of the side enclosure 300, and a removable and flat bottom panel 306. The side enclosure 300 without its top and bottom panels has a flat top surface and a flat bottom surface. The top and bottom surfaces of the side enclosure 300 can be parallel to each other.

The side enclosure 300 can have six panels that form a six-sided polygon. One of the side panel 304a of the side enclosure 300 includes a through hole 302 that extends along the x-axis to allow electrical cabling inserted through the side panel of the main enclosure to be inserted into the side enclosure 300. As shown in FIG. 3, the side panel 304a that includes the through hole 302 also includes a plurality of screw holes to couple a side enclosure 300 to a side panel of the main enclosure. The width and height of the side panel 304a can be the same as the width and height of a side panel of the main enclosure, so that when a side enclosure 300 is coupled to the main enclosure, the top and bottom panels of the side enclosure can be at the same level as the top and bottom panels of the main enclosure.

The top and bottom surfaces of the side enclosure 300 are covered by a top panel and the bottom panel 306, respectively. FIG. 3 shows the side enclosure 300 without its top panel to more clearly describe the features of the side enclosure 300. The top panels of the side enclosures are seen in FIG. 1A and has a six-sided shape that corresponds to the six-sided shape of the top surface of the side enclosures 300. The bottom panel 306 has a six-sided shape that corresponds to the six-sided shape of the bottom surface of the main enclosure 300. The top and bottom surface of the side enclosure 300 include a plurality of screw holes located around the periphery of a cavity of the side enclosure 300 to couple the top and bottom panels to the side enclosure 300. The top and bottom panels may be coupled to the respective top and bottom surface of the main enclosure 300 using screws.

The surface area of the top surface of the side enclosure 300 is greater than the surface area of the bottom surface of the side enclosure 300 in part because two adjacent side panels 304c and 304d are angled towards the road or ground. The two side panels 304c, 304d are designed to have a pre-determined obtuse angle (e.g., greater than 90°) relative to the bottom panel 306. In some embodiments, the angle formed between the two side panels 304c, 304d and the bottom panel 306 may be 160°.

The side panel 304a is parallel to a side panel 304d with an opening 308. Such a design allows cameras placed in the side enclosure and facing towards the opening 308 of side panel 304d to obtain images of an area on a side of a vehicle. As shown in FIG. 1A, one of the opening 110a in the side enclosure 106b faces an area to the side of the vehicle. In FIG. 3, the side panel 304a and the side panel 304c with an opening 308 are connected via another side panel 304b. The side panel 304c forms an angle of 45° relative to the side panel 304a. Such a design allows cameras placed in the side enclosure and facing towards the opening 308 of side panel 304c to obtain images of an area on a front and side of a vehicle. As shown in FIG. 1A, one of the opening 110b in the side enclosure 106b faces an area to the front and side of the vehicle. The side panel 304d is connected to side panel 304c on one side and side panel 304e on another side. In some embodiments, an angle formed between the two side panels 304c and 304d may be 135°. Side panel 304e can be parallel to 304b. Side panel 304f connects side panel 304e and side panel 304a.

FIG. 3 shows that each of the two side panels 304c, 304d has an opening 308 or an area that is cut out. Each opening 306 has a rectangular shape. The two openings 306 leads to a single cavity located behind the two side panels 304c, 304d. The height of the cavity in the side enclosure 300 can be the same as the height of the side enclosure 300.

The interior surface of the side panels 304a-304f forms the walls of a cavity in the side enclosure 300. The cavity is enclosed on top and bottom by the removable top panel and the removable bottom panel 204. The volume of the cavity in the side enclosure 300 is designed to allow one or more cameras with their electrical cabling to be installed in the cavity. For example, three cameras may be installed in the cavity of the side enclosure 300 where one of the cameras may be recording images and the other two cameras may be redundant or backup cameras.

The side enclosure 300 can be machined from a single block of aluminum or another metal with the six panels 304a-304f and with the openings 308, cavity formed within the six panels and top and bottom panels, and the through hole 302 shown in FIG. 3. Thus, in some embodiments, the six panels 304a-304f are not removable and are a part of the structure that forms the side enclosure 300.

Figure 4:
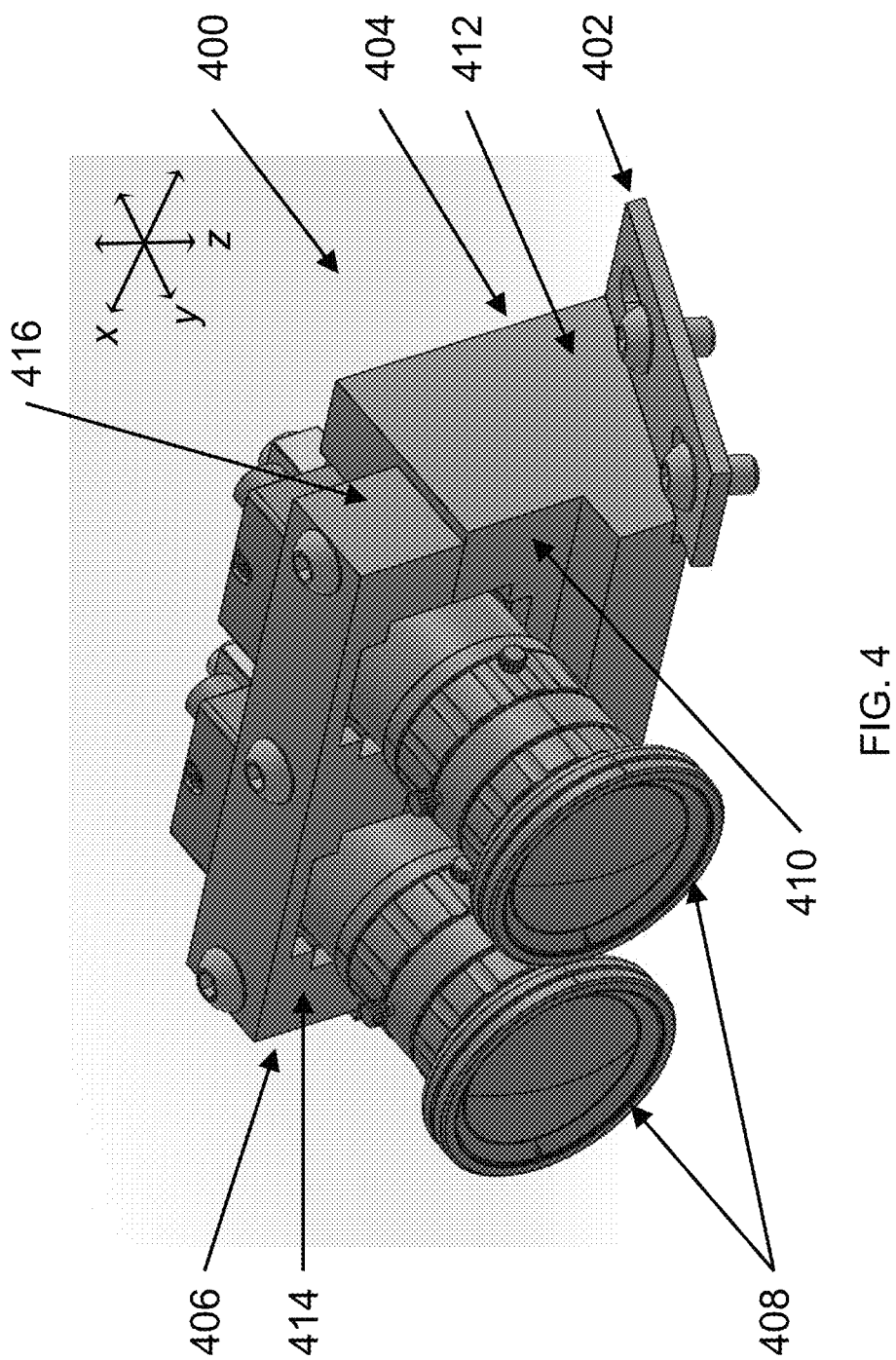
FIG. 4 describes an exemplary camera lock apparatus used to mount cameras within the integrated housing assembly.

FIG. 4 describes an exemplary camera lock apparatus 400 used to mount cameras within the integrated housing assembly. The exemplary lock apparatus 400 has a two-piece clamp design having a bottom portion 404 and a top portion 406. The bottom portion 404 is coupled to a bottom panel of the main enclosure and/or side enclosures, and the top portion 406 is coupled to the bottom portion 404 via screws.

The top portion 406 is a solid structure with a first set of four side surfaces that include a front surface 414, a rear surface opposite to and having the same shape as the front surface 414, and two side surfaces 416 that are parallel to each other and having the same shape as each other. A flat top surface of the top portion 406 includes screw holes to allow the top portion 406 to be coupled to the bottom portion 404 via screws. The screw holes extend from the top surface of the top portion 406 to the bottom surface of the top portion 406, where the bottom surface of the top portion 406 is opposite to the top surface of the top portion 406. The bottom surface of the top portion 406 includes cutout regions that form approximately one half of the through hole region.

A bottom portion 404 is a solid structure that includes a top surface attached to a second set of four side surfaces and a bottom surface that is opposite to the top surface. The top surface of the bottom portion 404 includes screw holes corresponding to the location of the screw holes in the top portion 406. The top surface of the bottom portion 404 includes cutout regions that form approximately one half of the through hole region. The four side surfaces of the bottom portion 404 include a front surface 410, a rear surface opposite to the front surface 410, and two side surfaces 412 that are parallel to each other. A front surface 410 and a rear surface are inclined. Thus, the height of the first surface 410 determined along an incline of the first surface 410 is less than the height of the rear surface determined along an incline of the rear surface, where the two heights are determined relative to a bottom surface of the bottom portion 404. The difference in the heights of the front and rear surfaces allow the bottom portion 404 to have a top surface (including the approximately one half of the through hole region) that is inclined downwards from the rear surface to the front surface 410.

The top portion 416 includes a bottom surface with a first set of cutout regions, and the bottom portion 404 includes a top surface with a second set of cutout regions. When the top portion 416 and the bottom portion 404 are coupled via screws, a first cutout region of the first set aligns with a first cutout region of the second set, a second cutout region of the first set aligns with a second cutout region of the second set, and so on. The alignment of the first and second sets of cutout regions form a plurality of through hole regions between the top portion 406 and the bottom portion 404. The plurality of through hole regions extend width-wise or along the y-axis. Thus, approximately one half of the through hole region is part of the top portion 406 and approximately one half of the through hole region is part of the bottom portion 404. As shown in FIG. 4, the two through hole regions allow the cameras 408 to be at least partially located in or partially fastened in between the top and bottom portions of the camera lock apparatus 400 to be fixed in place.

FIG. 4 shows that the lock apparatus 400 can clamp cameras at a desired downward pitch angle or downward sloping (or inclined) angle relative to a bottom panel to which the lock apparatus 400 is coupled, as explained below. The downward pitch angle or inclined angle allow the camera to obtain images of the road, the vehicles or pedestrians on the road, and/or areas surrounding the road. A benefit of the lock apparatus 400 is that is allows a pitch angle or a downward sloping angle of the cameras to be fixed, which can simply the calibration process to point the cameras to obtain information from desired area(s). Another benefit of the lock apparatus 400 with the fixed pitch angle is that it can minimize changes in the downward angle of the cameras and thus, minimize the effect of vibrations caused by driving on the cameras.

The bottom portion 404 of the lock apparatus includes two flanges or protrusions. One of the flanges 402 is shown in FIG. 4. Each flange 402 includes two screws inserted through two through holes or slots that extend along the z-axis. The two through holes or slots are designed to adjust or calibrate the cameras by moving the lock apparatus 400 closer to or farther from the openings in the main enclosure and/or side enclosures. Thus, the lock apparatus 400 can be coupled to the bottom panel of the main enclosure or the optional side enclosures via the screws inserted in the through holes of the two flanges.

In some embodiments, the exemplary camera lock apparatus shown in FIG. 4 can also be used to mount cameras on top of a roof of a vehicle without the integrated housing assembly. For example, the screws in each flange 402 can be used to couple the camera lock apparatus 400 to one or more brackets on top of a roof of a vehicle. In such embodiments, a plurality of camera lock apparatus 400 can be coupled to one or more brackets located on top of a roof of a vehicle. In other embodiments, as explained above, the camera lock apparatus 400 can be coupled to the bottom panel(s) of the main enclosure and/or side enclosure, where the main enclosure is coupled to the one or more brackets on top of a roof of a vehicle.

FIGS. 2 and 3 show that the bottom panels of the main enclosure and the side enclosures includes screw holes to allow the camera lock apparatus to be coupled to the bottom panels at desired locations. A benefit of having screw holes in the bottom panels for the lock apparatus is that it can be used to control the areas recorded by or sensed by the cameras. Thus, the locations of the screw holes in the bottom panels can be pre-determined to control the angular rotation of the cameras along the z-axis.

FIG. 4 shows an exemplary lock apparatus 400 that can clamp two cameras. In some embodiments, a lock apparatus 400 can include three or more through hole regions between the top portion 406 and a bottom portion 406 so that three or more cameras may be clamped between the top and bottom portions of the lock apparatus 400.

Figure 5A:
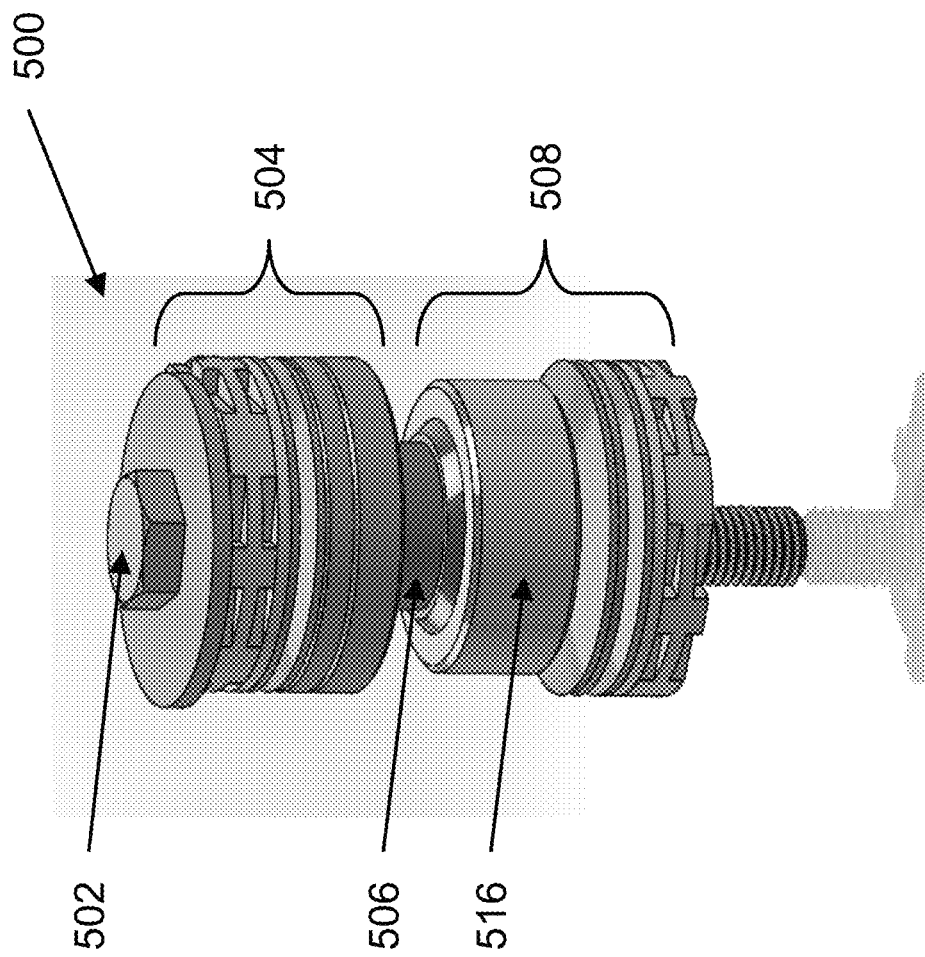
FIGS. 5A and 5B show an exemplary design for a vibration and fastener kit used to couple the integrated housing assembly to a vehicle.
Figure 5B:
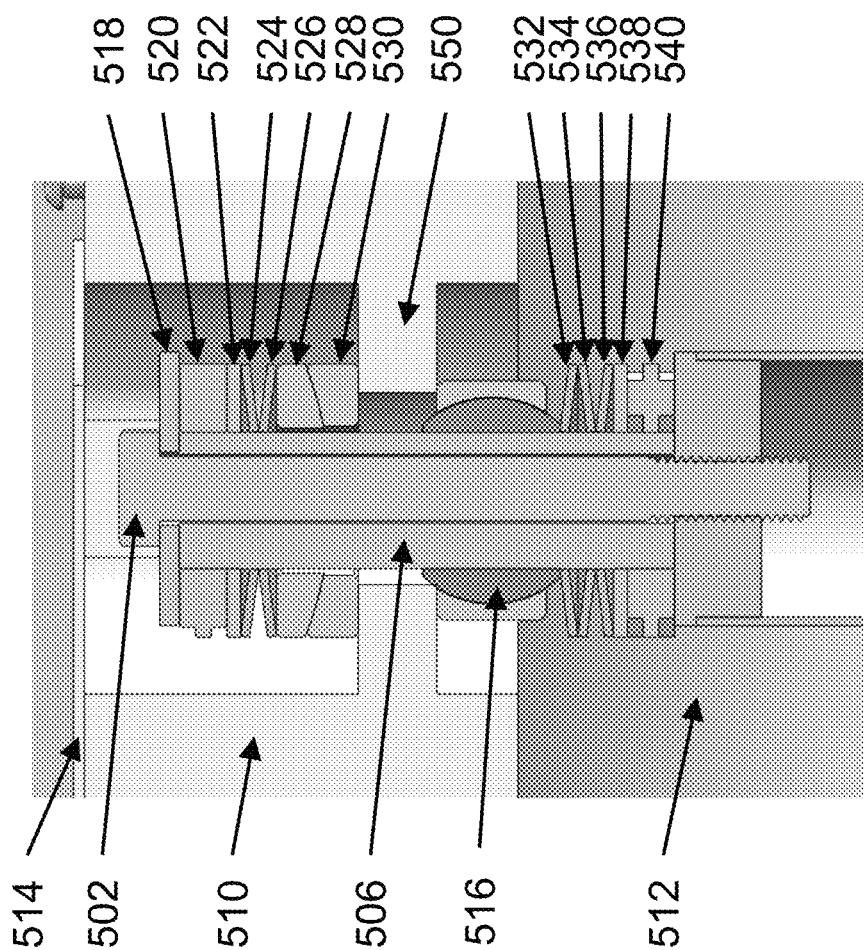

FIGS. 5A to 5B show an exemplary design for a vibration and fastener kit or assembly 500 used to couple the integrated housing assembly to a vehicle. FIG. 5A shows a complete vibration and fastener kit 500. The kit 500 includes a threaded screw 502, a first set of a plurality of washers 504, a cylinder 506 that through which the threaded screw 502 is inserted, and a second set of a plurality of washers. As shown in FIG. 5B, the second set of a plurality of washers includes a ball joint swivel bearing 516 that is wedged between a protrusion in the through hole and a bracket on top of a vehicle.

FIG. 5B shows a vertical cross-section of a main enclosure 510 of the integrated housing assembly coupled to a single bracket 512 on top of a vehicle via the vibration and fastener kit 500. As mentioned above, the kit 500 is inserted through each of the three through holes (212a-212c in FIG. 2) of the main enclosure. A vertical cross-section of the main enclosure 510 shows one of the through holes of the main enclosure. The design of the other two through holes of the main enclosure is the same as the through hole shown in FIG. 5B. The through hole shown in FIG. 5B includes a protrusion 550 at a depth that is less than the height of the through hole. The protrusion 550 extends from the inside wall of the through hole. The protrusion 550 has a hole that extends from a side facing the top panel 514 on top of the through hole to the side facing the bracket 512.

As shown in FIG. 5B, when the screw 502 is inserted within the through hole and screwed into the bracket 512, there is a gap between the top of the screw 502 and the bottom surface of the top panel 514. This gap allows the top panel 514 to be coupled to the main enclosure 510 without having any mechanical interference from the vibration and fastener kit 500.

FIG. 5B further describes the stack of the two sets of washers 504, 508 that are designed to minimize the effects of vibration and tolerancing on the main enclosure. A first set of a plurality of washers are located above the protrusion 550 and includes an ordered set of the following washers from top to bottom: flat washer 518, rubber washer 520, flat washer 522, two disk washers 524, 526 disposed with the curved side facing each other (shown in FIG. 5B), and two leveling washers 528, 530. A ball joint swivel bearing and a second set of a plurality of washers are located below the protrusion 550 in the following ordered set from top to bottom: a ball joint swivel bearing 516, three disk washers 532, 534, 536, a flat washer 538, and a rubber washer 540.

Figure 6:
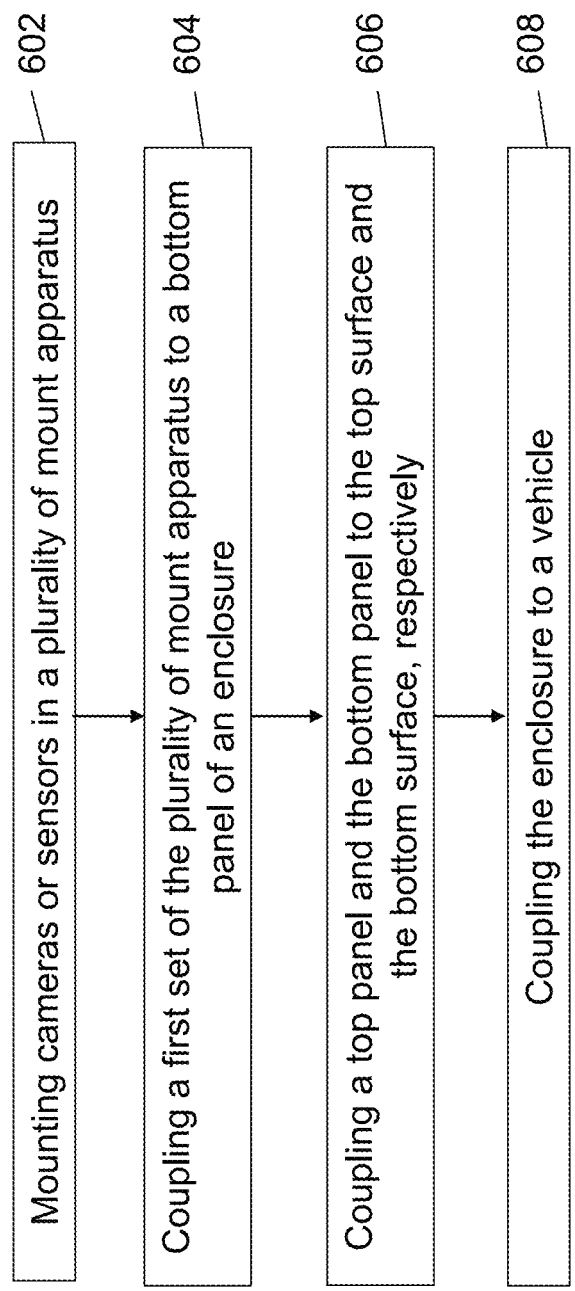
FIG. 6 shows an exemplary method for mounting an integrated multipurpose perception housing assembly on a vehicle.

FIG. 6 shows an exemplary method for mounting an integrated multipurpose perception housing assembly on a vehicle. At the mounting operation 602, cameras or sensors are mounted in a plurality of mount apparatus. At the coupling operation, a first set of the plurality of mount apparatus is coupled to a bottom panel of an enclosure. The enclosure comprises four side surfaces attached to a top surface and a bottom surface, where the four side surfaces comprise a first side surface opposite to a third side surface, and a second side surface opposite to a fourth side surface, where the first side surface has an opening, where a cavity is located in between the four side surfaces, and where the cavity is accessible via the opening.

At the coupling operation 606, a top panel and the bottom panel are coupled to the top surface and the bottom surface, respectively. The first set of the plurality of mount apparatus coupled to the bottom panel have cameras with lenses or sensors that face the opening. At the coupling operation 608, the enclosure is coupled to a vehicle.

The method described in FIG. 6 can further include the following operations: coupling a second set of the plurality of mount apparatus to a second bottom panel of each of the first side enclosure and the second side enclosure, where each of the first side enclosure and the second side enclosure comprises a plurality of side surfaces comprising at least a fifth side surface, a sixth side surface, and a seventh side surface, and where each of the sixth side surface and the seventh side surface have another opening; coupling a second top panel to a top surface of each of the first side enclosure and the second side enclosure; coupling the second bottom panel to a bottom surface of each of the first side enclosure and the second side enclosure, where the second set of the plurality of mount apparatus coupled to the second bottom panel have cameras with lenses or sensors that face either the another opening in the sixth side surface or the another opening in the seventh side surface; coupling the fifth side surface of the first side enclosure to the second side surface of the enclosure; and coupling the fifth side surface of the second side enclosure to the fourth side surface of the enclosure.

The integrated housing assembly can simplify the installation and maintenance of cameras in or on a vehicle. Compared to conventional designs where the cameras are visibly mounted on top of a mounting apparatus, the design of the integrated housing assembly described in this patent document can improve aerodynamics and can protect the cameras and/or sensors inside the assembly from the environment and from potential theft. Furthermore, space inside the integrated housing assembly can conveniently be used to add or remove cameras or other devices to obtain the desired information for applications such as autonomous driving.

The exemplary embodiments described herein use terms such as rectangular, oval, circular, trapezoid, or square to describe the shapes and associations between the various objects. Such descriptions, however, are not to be construed as limiting the full scope of the inventive features. For example, the through holes 214 in FIG. 2 may be circular or the opening 206 may have an oval shape. In this patent document the term "exemplary" is used to mean "an example of" and, unless otherwise stated, does not imply an ideal or a preferred embodiment. In this patent document, the term "coupled" is used to mean directly coupled unless otherwise specified or indicated.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for mounting an assembly on a vehicle, comprising:
   mounting cameras or sensors in a first set of mount apparatus;
   coupling the first set of mount apparatus to a bottom panel of an enclosure,
      wherein the enclosure comprises four side surfaces located in between a top surface and a bottom surface,
      wherein the four side surfaces comprise a first side surface opposite to a third side surface, and a second side surface opposite to a fourth side surface,
      wherein the first side surface has an opening,
      wherein a cavity is located in between the four side surfaces,
      wherein the cavity is accessible via the opening,
      wherein the enclosure is coupled to the vehicle by inserting a set of fastener assemblies in a set of holes in the enclosure,
      wherein the set of holes are located towards the third side surface,
      wherein each hole extends from the top surface to the bottom surface, and
      wherein each hole includes a fastener assembly;
   coupling a top panel and the bottom panel to the top surface and the bottom surface, respectively,
      wherein the first set of mount apparatus coupled to the bottom panel have the cameras or the sensors that face the opening; and
   coupling the enclosure to the vehicle.

2. The method of claim 1, further comprising:
   coupling a second set of mount apparatus to a second bottom panel of a side enclosure,
      wherein the side enclosure comprises a plurality of side surfaces,
      wherein at least one side surface of the plurality of side surfaces includes another opening, and wherein the second set of mount apparatus coupled to the second bottom panel have a second set of cameras or sensors that face the another opening in the at least one side surface;

coupling a second top panel to a top surface of the side enclosure;

coupling the second bottom panel to a bottom surface of the side enclosure; and coupling another side surface of the plurality of side surfaces of the side enclosure to the second side surface of the enclosure or to the fourth side surface of the enclosure.

3. The method of claim 2, further comprising:
inserting electrical cables into the enclosure from a set of through holes that extend from one side of the third side surface to another side of the third side surface,
wherein the electrical cables are inserted into the cavity of the enclosure,
wherein the cameras receive power from the electrical cables, and
wherein at least some of the electrical cables are inserted into the side enclosure by inserting the at least some of the electrical cables via a hole in the second side surface of the enclosure or in the fourth side surface of the enclosure.

4. The method of claim 2, wherein for each mount apparatus in the first set of mount apparatus or the second set of mount apparatus, the method further comprises:
coupling a solid top portion of a mount apparatus to a solid bottom portion of the mount apparatus,
wherein the coupling of the solid top portion to the solid bottom portion aligns a first set of cutout regions on a bottom of the solid top portion with a second set of cutout regions on top of the solid bottom portion to form a plurality of through holes having a inclined angle relative to a bottom surface of the solid bottom portion.

5. The method of claim 4,
wherein the solid top portion comprises:
a first top surface,
a first bottom surface opposite to the first top surface and comprising the first set of cutout regions, and
a set of holes that extend from the first top surface to the first bottom surface; and
wherein the solid bottom portion comprises:
a second top surface that comprises another set of holes corresponding to the set of holes, wherein the second top surface includes the second set of cutout regions, and
a second bottom surface opposite to the second top surface.

6. The method of claim 4, further comprising:
fastening a plurality of cameras in between the plurality of through holes, wherein each camera has a lens that faces the opening or the another opening.

7. The method of claim 6, wherein the plurality of cameras are partially fastened in between the plurality of through holes.

8. The method of claim 6, wherein the plurality of cameras have a fixed downward angle relative to the bottom surface of the solid bottom portion after the plurality of cameras are fastened in between the plurality of through holes having the inclined angle.

9. The method of claim 4, further comprising:
adjusting a position of at least one mount apparatus in the first set of mount apparatus or the second set of mount apparatus by moving the at least one mount apparatus closer to or farther from the opening or from the another opening.

10. The method of claim 9,
wherein the at least one mount apparatus includes flanges that include a plurality of slots through which a plurality of screws that are inserted to couple the at least one mount apparatus to the bottom panel or to the second bottom panel.

11. The method of claim 1,
wherein the first set of mount apparatus are coupled to the bottom panel of the enclosure using a plurality of screw holes in the bottom panel, and
wherein locations of the plurality of screw holes in the bottom panel are pre-determined.

12. The method of claim 1,
wherein each hole includes an inner wall having a protrusion at a depth less than a height of a hole,
wherein each fastener assembly includes a first set of washers located on top of the protrusion, and
wherein each fastener assembly includes a second set of washers and a ball joint swivel bearing located below the protrusion.

13. The method of claim 12, wherein the second set of washers are located in between the ball joint swivel bearing and a bracket on top of the vehicle with which the enclosure is coupled to the vehicle.

14. The method of claim 1,
wherein each fastener assembly includes a screw with which the enclosure is coupled to a bracket on top of the vehicle, and
wherein the screw is inserted in a hole from the set of holes to engage the bracket on top of the vehicle.

15. The method of claim 1, wherein a top of each fastener assembly is located below the top panel.

16. The method of claim 15, wherein a gap exists between a bottom of the top panel and the top of each fastener assembly.

17. The method of claim 1, wherein the bottom panel extends from an edge of the first side surface to the set of holes in the bottom surface.

18. The method of claim 1, further comprising:
inserting electrical cables into the enclosure from a set of through holes that extend from one side of the third side surface to another side of the third side surface,
wherein the electrical cables are inserted into the cavity of the enclosure, and
wherein the cameras receive power from the electrical cables.

19. The method of claim 1, wherein the enclosure is machined from a single block of metal.

20. A method for mounting an assembly on a vehicle, comprising:
mounting cameras or sensors in a first set of mount apparatus;
coupling the first set of mount apparatus to a bottom panel of an enclosure,
wherein the enclosure comprises four side surfaces located in between a top surface and a bottom surface,
wherein the four side surfaces comprise a first side surface opposite to a third side surface, and a second side surface opposite to a fourth side surface,
wherein the first side surface has an opening,
wherein a cavity is located in between the four side surfaces, and wherein the cavity is accessible via the opening;

coupling a top panel and the bottom panel to the top surface and the bottom surface, respectively,
   wherein the first set of mount apparatus coupled to the bottom panel have the cameras or the sensors that face the opening;

coupling the enclosure to the vehicle;

coupling a second set of mount apparatus to a second bottom panel of a side enclosure,
   wherein the side enclosure comprises a plurality of side surfaces,
   wherein at least one side surface of the plurality of side surfaces includes another opening,
   wherein the second set of mount apparatus coupled to the second bottom panel have a second set of cameras or sensors that face the another opening in the at least one side surface,
   wherein for each mount apparatus in the first set of mount apparatus or the second set of mount apparatus, a solid top portion of a mount apparatus is coupled to a solid bottom portion of the mount apparatus, and
   wherein the coupling of the solid top portion to the solid bottom portion aligns a first set of cutout regions on a bottom of the solid top portion with a second set of cutout regions on top of the solid bottom portion to form a plurality of through holes having an inclined angle relative to a bottom surface of the solid bottom portion;

fastening a plurality of cameras in between the plurality of through holes, wherein each camera has a lens that faces the opening or the another opening;

coupling a second top panel to a top surface of the side enclosure;

coupling the second bottom panel to a bottom surface of the side enclosure; and coupling another side surface of the plurality of side surfaces of the side enclosure to the second side surface of the enclosure or to the fourth side surface of the enclosure.

* * * * *

UNITED STATES PATENT AND TRADEMARK OFFICE
CERTIFICATE OF CORRECTION

PATENT NO. : 11,685,321 B2
APPLICATION NO. : 17/556717
DATED : June 27, 2023
INVENTOR(S) : Qiwei Li et al.

It is certified that error appears in the above-identified patent and that said Letters Patent is hereby corrected as shown below:

On the Title Page

In Item (57), under "ABSTRACT", in Column 2, Line 9, delete "opening." and insert -- openings. --, therefor.

In the Specification

In Column 1, Line 8, delete "2019." and insert -- 2019, now U.S. Pat. No. 11,203,305. --, therefor.

In Column 2, Line 29, delete "a inclined" and insert -- an inclined --, therefor.

In Column 3, Line 38, delete "a inclined" and insert -- an inclined --, therefor.

In Column 3, Line 60, delete "a inclined" and insert -- an inclined --, therefor.

In Column 4, Line 43, delete "DRAWING" and insert -- DRAWINGS --, therefor.

In Column 6, Line 50, delete "immediately front" and insert -- immediately in front --, therefor.

In Column 7, Line 62, delete "to a" and insert -- to as a --, therefor.

In Column 8, Line 55, delete "in installed." and insert -- is installed. --, therefor.

In Column 9, Line 26, delete "304a-302f" and insert -- 304a-304f --, therefor.

In Column 10, Lines 25-26, delete "opening 306" and insert -- opening 308 --, therefor.

In Column 10, Line 26, delete "leads" and insert -- lead --, therefor.

In Column 11, Line 22, delete "top portion 416" and insert -- top portion 406 --, therefor.

Signed and Sealed this
Twenty-second Day of August, 2023

Katherine Kelly Vidal
*Director of the United States Patent and Trademark Office*

CERTIFICATE OF CORRECTION (continued)
U.S. Pat. No. 11,685,321 B2

In Column 11, Lines 24-25, delete "top portion 416" and insert -- top portion 406 --, therefor.

In Column 11, Line 47, delete "is that is" and insert -- is that it --, therefor.

In Column 11, Line 49, delete "simply" and insert -- simplify --, therefor.

In Column 12, Line 24, delete "bottom portion 406" and insert -- bottom portion 404 --, therefor.

In Column 12, Line 32, delete "that through" and insert -- through --, therefor.

In Column 13, Line 10, delete "coupling operation," and insert -- coupling operation 604, --, therefor.

In the Claims

In Column 15, Line 37, in Claim 4, delete "a inclined" and insert -- an inclined --, therefor.